Patented Feb. 14, 1950

2,497,073

UNITED STATES PATENT OFFICE 2,497,073

REACTION PRODUCTS OF DICYANDIAMIDE WITH AN AMINE-FORMALDEHYDE REACTION PRODUCT

James R. Dudley, Darien, and John A. Anthes, Springdale, Conn., assignors to American Cyanamid Company, New York, N. Y., a corporation of Maine No Drawing. Application March 5, 1947, Serial No. 732,658

2 Claims. (Cl. 260—70)

This invention relates to new synthetic compositions and more particularly to new and useful reaction products of dicyandiamide with an amine-formaldehyde reaction product. The invention specifically is concerned with the production of compositions, e. g., aqueous compositions, comprising a water-soluble product of reaction of (1) dicyandiamide with (2) the product of reaction, under acid conditions, of formaldehyde (including compounds engendering or yielding formaldehyde) and an amine selected from the class consisting of primary aromatic monoamines (e. g., aniline) and secondary monoamines having at least one monovalent aromatic radical attached to the amine nitrogen atom (e. g., N-methylaniline). In preparing the reaction product of (2) the formaldehyde and the amine are employed in the ratio of from about 0.5 to about 1.5 mols, more particularly from about 0.6 to about 1.3 mols, of the former per mol of the latter. The dicyandiamide is used in an amount corresponding to at least about 0.9 mol thereof, more particularly from about 1 to about 1.3 mols thereof, for each mol of the amine used in forming the reaction product of (2). The present invention is directed specifically to methods of preparing particular reaction products of the kind described above and wherein the amine reactant is N-methylaniline.

The products of the present invention have various uses in the coating, impregnating and other arts, but are especially suitable for use as a cationic modifier of urea-formaldehyde resins as more fully described and claimed in our co-pending application Serial No. 732,659, filed concurrently herewith.

It was known prior to our invention that condensation products could be prepared by condensing formaldehyde with the product obtained by heating, at ordinary pressure and under substantially anhydrous conditions, dicyandiamide and aniline in the ratio of 2.7 to 3.2 mols of the former per mol of the latter at a temperature and for a time sufficient to liberate a substantial amount of ammonia.

It was also known that primary aromatic amines, e. g., aniline, could be condensed with an aldehyde, e. g., formaldehyde, to yield water-insoluble resins which bind anions in a form capable of exchange. The broad suggestion also has been made that a water-insoluble aniline-formaldehyde resin be "after-treated" with dicyandiamide in order to increase its capacity to split neutral salts while binding or absorbing anions. The suggested treatment is applied to the comminuted, water-insoluble aniline-formaldehyde resin, and the treated product also is water-insoluble.

The present invention is based on our discovery that water-soluble reaction products capable of improving the properties of urea-formaldehyde resins, especially those which are used in the treatment of paper to improve its properties, e. g., its wet-strength characteristics, can be prepared as broadly described in the first paragraph of this specification and more fully hereafter. These new reaction products readily dissolve in water in concentrations as high as 50% or more and remain in solution under acid conditions without gelation. The aqueous solutions of these reaction products readily can be concentrated or diluted to yield liquid compositions of adjusted viscosity and concentration.

In practicing our invention reaction is effected under acid conditions between formaldehyde or a compound engendering or yielding formaldehyde, e. g., paraformaldehyde, trioxane, etc., and a primary aromatic (aromatic hydrocarbon) monoamine or a secondary monoamine having at least one aromatic (aromatic hydrocarbon) radical attached to the amine nitrogen atom. In all cases the amine employed has at least two unsubstituted positions which are ortho or para to the amino group. Illustrative examples of amines that may be used are aniline, N-methylaniline, N-ethylaniline, N-propylaniline, N-isopropylaniline, N-n-butylaniline, N-isobutylaniline, N-sec.-butylaniline, N-allylaniline, o-, m-, and p-toluidines, o-aminodiphenyl, α-naphthylamine, β-naphthylamine, 2,3-xylidine, 3,4-xylidine, 3,5-xylidine, etc.

The reaction between the formaldehyde and the monoamine may be effected at various temperatures ranging, for example, from 40° or 50° C. up to the reflux or boiling temperature of a solution, more particularly an aqueous solution, of the reactants. The time of reaction will vary depending, for instance, upon the particular reactants and proportions thereof employed, the kind of acid used, the pH of the reaction mixture, the temperature employed, etc. When other influencing factors are the same, the time of reaction is longer at the lower temperatures than at the higher temperatures. In order to avoid or lessen the possibility of precipitation, the formaldehyde preferably is added slowly to the monoamine dissolved in an aqueous solution of the acid employed, that is, to an aqueous solution of the monoamine salt. Ordinarily the desired degree of reaction is obtained by heating an acidified aqueous solution of the monoamine under reflux at the boiling temperature of the mass, while slowly adding an aqueous solution of formaldehyde thereto, over a period of from about ¼ to about 2½ hours. In some cases the aqueous formaldehyde may be added rapidly to the acidified solution of the monoamine and the resulting mixture heated under reflux until any precipitate which forms has redissolved.

The molar proportions of formaldehyde and monoamine are important. If substantially less than about 0.5 mol of formaldehyde per mol of monoamine be employed, the resulting reaction product is too low in molecular weight to provide, upon reaction with dicyandiamide, a satisfactory cationic modifier of urea-formaldehyde resin. If more than about 1.5 mols of formaldehyde per mol of monoamine be used, the product gels and, upon reaction with dicyandiamide, yields a product which, depending upon the amount of formaldehyde employed, either is not water-soluble or does not form a stable aqueous solution. We prefer to use the formaldehyde and the monoamine in the ratio of from about 0.6 to about 1.3 mols of the former per mol of the latter, e. g., from 0.7 to 1.2 mols of formaldehyde per mol of the monoamine, e. g., aniline, N-methylaniline, etc. With aniline and an N-lower alkyl aniline, more particularly N-methylaniline, optimum results have been obtained using about 0.75 mol of an aqueous solution of formaldehyde per mol of aniline or N-methylaniline.

The reaction between the formaldehyde and the monoamine is effected under acid conditions, usually strongly acid conditions, e. g., at a pH between 0.5 and 4. Ordinarily the reaction is effected under heat at a pH not substantially exceeding about 3, more particularly at a pH of 2 or less, e. g., from 0.5 to 2.

Any suitable organic or inorganic acid may be used in obtaining the desired acid conditions for effecting reaction between the formaldehyde and the monoamine. Illustrative examples of acids that may be employed are the inorganic acids, e. g., hydrochloric, hydrobromic, sulfuric, phosphoric, etc., and the organic acids, e. g., formic, acetic, oxalic, tartaric, malic, citric, lactic, benzoic, etc. We prefer to use a strong mineral acid such, for example, as hydrochloric acid.

The amount of dicyandiamide which is reacted with the monoamine-formaldehyde reaction or condensation product is important in so far as the minimum amount thereof is concerned. The dicyandiamide should be employed in an amount corresponding to at least about 0.9 mol thereof for each mol of the monoamine used in forming the armine-formaldehyde reaction product. No particular advantage ordinarily accrues from using more than about 1.2 mols of dicyandiamide per mol of the monoamine reactant, although more may be used if desired, for example, 1.5 or more mols of dicyandiamide for each mol of the monoamine employed. When the dicyandiamide is used in an amount above about 1 mol thereof per mol of the monoamine, the excess dicyandiamide above 1 mol is merely present in the final product as unreacted dicyandiamide or as a hydrolysis product thereof. We prefer to use the dicyandiamide in a molar amount approximately equal to the molar amount of monoamine employed or to use a slight molar excess of dicyandiamide, e. g., from 1.05 to 1.15 mols of dicyandiamide per mol of the monoamine employed in forming the amine-formaldehyde reaction product.

The reaction between the dicyandiamide and the amine-formaldehyde reaction product is preferably effected or at least initiated under acid conditions. The acidity of the amine-formaldehyde reaction product or aqueous solution thereof may be adjusted as desired or as may be required prior to the addition of the dicyandiamide. For example, if the pH of the aqueous amine-formaldehyde reaction product is less than 2, it may be increased by adding a suitable alkaline substance (that is, a substance which gives an alkaline reaction in water) thereto, for instance, a hydroxide or carbonate of an alkali metal (e. g., sodium or potassium hydroxide or carbonate), calcium hydroxide, barium hydroxide, etc. In this way the pH may be increased to, for example, 3 or 4 or more prior to adding the dicyandiamide. As the reaction between the dicyandiamide and amine-formaldehyde reaction product proceeds, the pH of the reaction mass ordinarily increases. Thus, depending upon the pH of the aqueous reaction product prior to adding the dicyandiamide, it may increase (depending upon the conditions of reaction including the amount of dicyandiamide employed) to from about 4.5 to about 6.5 toward the end of the reaction period. We prefer that the pH of the final product, especially when it is to be used as a cationic modifier of a urea-formaldehyde resin, be acid at the end of the reaction period, e. g., a pH of 4.5 to 6.

The amine-formaldehyde reaction product may be diluted with additional water, if desired, prior to adding the dicyandiamide thereto.

The dicyandiamide and amine-formaldehyde reaction product are caused to react at a suitable temperature, for instance, under temperature conditions such as above described with reference to the production of the amine-formaldehyde reaction product. The time of reaction may vary considerably, the end of the reaction ordinarily being indicated by a substantial change in the color of the original reaction mass. Generally the reaction is completed by heating the reaction mass under reflux at boiling temperature for a period of the order of ¾ to 3½ or 4 hours, more particularly for about 1 to 3 hours.

The final aqueous solution of the water-soluble resinous or polymeric reaction product may be diluted or concentrated to obtain a liquid resinous composition of a particular viscosity or a particular concentration of solids. If desired, the product may be substantially completely dehydrated, for example, by heating, preferably under reduced pressure, to obtain a solid, water-soluble, non-crystalline or resinous reaction product. If desired, the reaction product may be precipitated as the free base by adding an aqueous solution of an alkali-metal hydroxide (e. g., sodium hydroxide) thereto, which product then is filtered off and dried. The dried product may be redissolved in an aqueous acid solution. The water-soluble reaction product is essentially polymeric in structure. When aniline is the amine employed in the preparation of the amine-formaldehyde reaction product, the polymer (linear polymer) is believed to correspond substantially to the formula

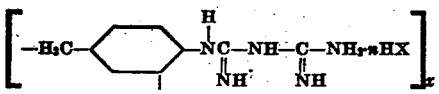

where $nHX$ represents the acid and amount thereof which is combined in the form of a salt with the reaction product of (1) dicyandiamide with (2) the amine-formaldehyde reaction product and $x$ represents a number which is at least 2 and may be as high as 20 or 30 or more.

In order that those skilled in the art better may understand how the present invention may be carried into effect the following examples are given by way of illustration and not by way of limitation. All parts are by weight.

Example 1

|  | Parts | Approx. Mol Ratio |
|---|---|---|
| Aniline | 93 | 1.0 |
| Concentrated hydrochloric acid (approx. 38% HCl) | 120 | 1.25 |
| Aqueous formaldehyde (approx. 37% HCHO) | 60 | 0.75 |
| Dicyandiamide | 84 | 1.0 |
| Water | 100 | |

The aniline, hydrochloric acid and water were mixed in a reaction vessel provided with a stirrer and a reflux condenser, and the mixture was heated to boiling. The aqueous formaldehyde was added slowly to the stirred, refluxing mixture over a period of ½ hour. A bright red color developed. Refluxing was continued for an additional hour, after which 7 parts of solid sodium hydroxide was added, thereby increasing the pH of the reaction mass to 3.5. The above-stated amount of dicyandiamide was then added all at once, and the resulting mixture was heated with stirring under reflux at the boiling temperature of the mass for 1½ hours, yielding an orange-colored solution of the reaction product in a yield amounting to 451 parts. Dilution of this solution with water to 465 parts yielded a product having a pH of approximately 5.5 and having a solids content (calculated as free base) of about 40%.

Example 2

Same as Example 1 with the exception that 72 parts instead of 60 parts of aqueous formaldehyde was employed. The resulting solution was darker colored than the product of Example 1 and, on cooling, a second phase separated. The separated phase redissolved upon adding 2.38 parts of concentrated hydrochloric acid to the reaction mass.

Example 3

|  | Parts | Approx. Molar Ratio |
|---|---|---|
| Aniline | 93 | 1.0 |
| Concentrated hydrochloric acid (approx. 38% HCl) | 120 | 1.25 |
| Aqueous formaldehyde (approx. 37% HCHO) | 72 | 0.9 |
| Dicyandiamide | 92 | 1.1 |
| Water | 100 | |

The aqueous formaldehyde was added rapidly to the stirred mixture of aniline and hydrochloric acid (solution of aniline hydrochloride), yielding a thick, yellow slurry which was heated to boiling with stirring. After heating for about 30 minutes a clear, bright red solution was obtained. The above-stated amount of dicyandiamide was then added all at once, and the resulting mixture was stirred and refluxed for 1½ hours, yielding an orange-colored solution of the reaction product.

Example 4

The same formula as in Example 3 with the exception that in this case 81 parts of 37% aqueous formaldehyde was employed. The aqueous formaldehyde was added slowly over a period of 20 minutes to the refluxing aniline hydrochloride solution. Thereafter 5 parts of solid sodium hydroxide was added in order partly to neutralize the excess hydrochloric acid. The dicyandiamide was added all at once, and the resulting mixture was heated with stirring under reflux at the boiling temperature of the mass for 2 hours, yielding a solution of the reaction product which was somewhat lighter in color than any of the products of the prior examples.

Example 5

|  | Parts | Approx. Molar Ratio |
|---|---|---|
| Aniline | 93 | 1.0 |
| Concentrated hydrochloric acid (approx. 38% HCl) | 108 | 1.125 |
| Aqueous formaldehyde (approx. 37% HCHO) | 117 | 1.45 |
| Dicyandiamide | 92 | 1.1 |
| Water | 100 | |

The same general procedure was followed as described under Example 1 with the exception that the excess hydrochloric acid was not neutralized. The addition of formaldehyde was continued until particles of gel began to form around the point of addition, the amount added being 117 parts. After adding the dicyandiamide, the stirred reaction mixture was heated under reflux for 3 hours, yielding an orange-colored solution of the reaction product with a pH of 5.

Example 6

|  | Parts | Approx. Molar Ratio |
|---|---|---|
| Aniline | 186 | 1.0 |
| Concentrated hydrochloric acid (approx. 38% HCl) | 211 | 1.1 |
| Aqueous formaldehyde (approx. 37% HCHO) | 121 | 0.75 |
| Dicyandiamide | 176 | 1.05 |

The concentrated hydrochloric acid was added to the aniline and the resulting solution was heated with stirring under reflux to boiling. The aqueous formaldehyde was added slowly to the stirred, refluxing solution over a period of 1½ hours. The dicyandiamide was then added all at once, and refluxing and stirring were continued for 1½ hours, yielding a light orange-colored solution of the reaction product. Sufficient water was added to this solution to provide a solution containing 50% of solids (calculated as the free base) and having a pH of 5.0. The solution of this example was lighter in color than the products of any of the prior examples.

Example 7

|  | Parts | Approx. Molar Ratio |
|---|---|---|
| N-methylaniline | 107 | 1.0 |
| Concentrated hydrochloric acid (approx. 38% HCl) | 106 | 1.1 |
| Aqueous formaldehyde (approx. 37% HCHO) | 60 | 0.75 |
| Dicyandiamide | 92 | 1.1 |

The N-methylaniline was dissolved in the concentrated hydrochloric acid, and the resulting solution of N-methylaniline hydrochloride was heated with stirring under reflux to boiling. The aqueous formaldehyde was added slowly to the stirred, refluxing solution over a period of 1 hour, yielding an orange-colored solution of the N-methylaniline-formaldehyde reaction product. The solution was diluted with water to 40% of solids (calculated as the free base). The dicyandiamide was added all at once to the diluted solution, after which the mixture was heated with stirring under reflux at the boiling temperature of the mass for 2 hours. The color of the solution became lighter and its viscosity increased toward the end of the reaction period.

The solid, water-soluble product of the reaction, which is in solution in the water, is essentially polymeric in structure. The polymer (linear polymer) is believed to correspond substantially to the formula

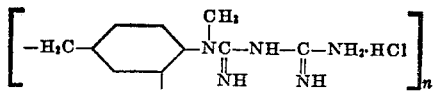

where $n$ represents a number which is at least 2 and may be as high as 20 or 30 or more.

Sufficient water was added to the solution prepared as above described to provide a solution containing 50% of solids calculated as the free base.

It will be understood, of course, by those skilled in the art that our invention is not limited to the specific reactants nor to the specific conditions of reaction shown in the above illustrative examples. Thus, instead of formaldehyde compounds engendering or yielding formaldehyde may be employed, e. g., paraformaldehyde, trioxane, etc. Also, instead of aniline or N-methylaniline, other primary aromatic monoamines or secondary monoamines having at least one monovalent aromatic radical attached to the amine nitrogen atom, numerous examples of which amines have been given hereinbefore, may be used. Organic or inorganic acids other than hydrochloric acid shown in the specific examples as the acid employed to provide acid conditions for the reaction may be used, e. g., sulphuric acid, phosphoric acid, acetic acid and others such as hereinbefore given by way of illustration.

The water-soluble reaction products of this invention may be used as such or in the form of aqueous solutions in the preparation of various resinous compositions which are useful in the coating, impregnating and laminating arts. For example, they may be employed as modifiers of phenol-formaldehyde resins, melamine-formaldehyde resins, etc. They are particularly valuable when used as a cationic modifier of various resins, e. g., a urea-formaldehyde resin, as more fully described in our aforementioned copending application Serial No. 732,659, in which application such modified resins are specifically claimed.

The reaction product of formaldehyde with a primary aromatic monoamine or a secondary monoamine having at least one monovalent aromatic radical attached to the amine nitrogen atom may be broadly defined as a "polyarylamine" or a "polymeric arylamine." Other products which also are embraced by this broad definition are (1) polymers obtained by polymerization of an aminostyrene, e. g., p-aminostyrene, etc.; (2) condensation products of an aromatic diamine, e. g., m-phenylenediamine, with an alkylenedihalide, e. g., ethylenedichloride; and (3) condensation products of an aromatic diamine, e. g., p,p'-diaminodiphenylmethane, with compounds such, for example, as epichlorohydrin, 1,3-dichloropropanol-2, and the like. Thus, the condensation of equal molar amounts of epichlorohydrin and p-p'-diaminodiphenylmethane will yield a linear polymer having secondary amino groups and which may be represented by the formula

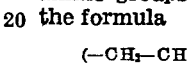

where $n$ represents a number which is greater than 2. "Polyarylamines" obtained as described under (1), (2) and (3), especially those which are relatively low in molecular weight, may be reacted with dicyandiamide and the resulting reaction product may be used as a cationic modifier of urea-formaldehyde resins in a manner similar to that described in our aforementioned copending application Serial No. 732,659.

We claim:

1. The method of preparing a new synthetic composition especially adapted for use as a cationic modifier of urea-formaldehyde resins, said method comprising heating together under reflux (1) an aqueous solution of formaldehyde and (2) an aqueous solution of N-methylaniline hydrochloride produced by dissolving N-methylaniline in concentrated hydrochloric acid in the ratio of 1.1 mols of HCl per mol of N-methylaniline, the formaldehyde of (1) and the N-methylaniline used in forming the N-methylaniline hydrochloride of (2) being employed in the ratio of 0.75 mol of formaldehyde per mol of N-methylaniline, adding dicyandiamide to the resulting aqueous solution of the N-methylaniline-formaldehyde reaction product in an amount corresponding to 1.1 mols thereof per mol of N-methylaniline used in forming the N-methylaniline hydrochloride, and heating the resulting aqueous, acidic reaction mass under reflux to effect reaction between the said dicyandiamide and the said N-methylaniline-formaldehyde reaction product.

2. The method of preparing a new synthetic composition especially adapted for use as a cationic modifier of urea-formaldehyde resins, said method comprising dissolving N-methylaniline in a concentrated aqueous solution of hydrochloric acid, the said N-methylaniline and hydrochloric acid being employed in the ratio of 1 mol of the former to 1.1 mols of the latter, heating the resulting solution of N-methylaniline hydrochloride with stirring under reflux to boiling, adding slowly to the stirred, refluxing solution, over a period of 1 hour, an aqueous solution of formaldehyde in a molar ratio corresponding to 0.75 mol thereof per mol of N-methylaniline used in forming the said N-methylaniline hydrochloride, diluting the resulting solution of N-methylaniline-formaldehyde reaction product with water to obtain a solution containing 40% of solids calculated as the free base, adding dicyandiamide to the resulting diluted solution in an amount corresponding to 1.1 mols thereof per mol of N-methylaniline used in forming the N-methylaniline hydrochloride, and heating the resulting aqueous, acidic reaction mass with stirring under reflux at the boiling temperature of the mass for a period of the order of 2 hours thereby to effect reaction between the said dicyandiamide and the said N-methylaniline-formaldehyde reaction product.

JAMES R. DUDLEY.
JOHN A. ANTHES.

REFERENCES CITED

The following references are of record in the file of this patent:

UNITED STATES PATENTS

| Number | Name | Date |
|---|---|---|
| 2,013,589 | Sutter et al. | Sept. 3, 1935 |
| 2,228,514 | Griesbach et al. | Jan. 14, 1941 |
| 2,317,184 | Dreyfuss | Apr. 20, 1943 |

OTHER REFERENCES

Goldschmidt: Chem. Ztg., 1905, vol. 29, p. 444.